United States Patent
Auer (10) Patent No.: US 10,645,578 B2
(45) Date of Patent: May 5, 2020

(54) SYSTEM FOR USING MOBILE TERMINALS AS KEYS FOR VEHICLES

(71) Applicant: Bayerische Motoren Werke Aktiengesellschaft, Munich (DE)

(72) Inventor: Hans Auer, Ergoldsbach (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 220 days.

(21) Appl. No.: 15/683,187

(22) Filed: Aug. 22, 2017

(65) Prior Publication Data
US 2017/0374550 A1 Dec. 28, 2017

Related U.S. Application Data

(63) Continuation of application No. PCT/EP2016/053336, filed on Feb. 17, 2016.

(30) Foreign Application Priority Data

Feb. 23, 2015 (DE) .......................... 10 2015 002 092

(51) Int. Cl.
| | |
|---|---|
| *H04W 12/06* | (2009.01) |
| *H04W 4/80* | (2018.01) |
| *H04W 4/44* | (2018.01) |
| *H04B 5/00* | (2006.01) |
| *H04W 12/04* | (2009.01) |

(52) U.S. Cl.
CPC .......... *H04W 12/06* (2013.01); *H04B 5/0025* (2013.01); *H04W 4/44* (2018.02); *H04W 4/80* (2018.02); *H04W 12/04* (2013.01)

(58) Field of Classification Search
CPC ....................................................... H04W 12/06
USPC ........................................................... 713/168
See application file for complete search history.

(56) References Cited

U.S. PATENT DOCUMENTS

| | | | | |
|---|---|---|---|---|
| 2013/0259232 | A1* | 10/2013 | Petel | H04L 63/0492 380/270 |
| 2014/0165159 | A1* | 6/2014 | Baade | H04L 63/08 726/4 |
| 2014/0298023 | A1 | 10/2014 | Oppermann et al. | |
| 2015/0137943 | A1* | 5/2015 | Nagel | G07C 9/00309 340/5.72 |
| 2017/0099320 | A1* | 4/2017 | Ratier | G06F 21/72 |

FOREIGN PATENT DOCUMENTS

| | | |
|---|---|---|
| DE | 44 11 451 C1 | 5/1995 |
| DE | 10 2012 012 389 A1 | 1/2013 |
| DE | 10 2014 217 899 A1 | 3/2016 |

OTHER PUBLICATIONS

PCT/EP2016/053336, International Search Report dated May 2, 2016 (Two (2) pages).

* cited by examiner

*Primary Examiner* — Jacob Lipman
(74) *Attorney, Agent, or Firm* — Crowell & Moring LLP (57) ABSTRACT

A method for configuring a mobile terminal to control vehicle functions of a vehicle, where the mobile terminal and the vehicle each have a short-range radio system, includes receiving a request to a server to issue a vehicle key for the use of vehicle functions of the vehicle for a mobile terminal. The method also includes generating the vehicle key by the server, transmitting the vehicle key to a secure element of the mobile terminal, and storing the vehicle key in the secure element of the mobile terminal.

15 Claims, 6 Drawing Sheets

SYSTEM FOR USING MOBILE TERMINALS AS KEYS FOR VEHICLES

CROSS REFERENCE TO RELATED APPLICATIONS

This application is a continuation of PCT International Application No. PCT/EP2016/053336, filed Feb. 17, 2016, which claims priority under 35 U.S.C. § 119 from German Patent Application No. 10 2015 002 092.7, filed Feb. 23, 2015, the entire disclosures of which are herein expressly incorporated by reference.

BACKGROUND AND SUMMARY OF THE INVENTION

The invention relates to a method for configuring a mobile terminal to control vehicle functions of a vehicle and to a server and to a vehicle.

It is known that a vehicle can be unlocked with an NFC device via an NFC reader in the external handle of a door. Furthermore, a travel release can be produced with this NFC device by means of an NFC reader in the passenger compartment. In particular, document DE 10 2014 217 899 describes a system which comprises configuring restricted access to a vehicle, with a first mobile unit, a second mobile unit and a central unit, wherein the first mobile unit is configured to generate data for addressing the access and data for authenticating the access, and the first mobile unit and the central unit are configured to transmit this data in a first message. In this context, the central unit is further configured to make available a second message for authorizing the access, which message has the data for authentication, on the basis of the data for addressing the at least one second mobile unit. Furthermore, the second mobile unit is configured to store the data for authentication and to transmit it directly to the vehicle by means of short range radio technology. The vehicle is configured to compare the data received from the second mobile unit for authentication with the data which is accessible to the vehicle in some other way for authentication and to release the access by means of the vehicle if the data for authentication correspond during the comparison.

An object of the invention is therefore to improve access to a vehicle, in particular an object of the invention is to improve access to a vehicle for mobile terminals.

According to one aspect, the invention is distinguished by a method for configuring a mobile terminal to control vehicle functions of a vehicle, wherein the mobile terminal and the vehicle each have a short range radio system. The mobile terminal can be a near field communication, referred to for short as NFC, device. The short range radio system may be, for example, NFC. A vehicle function can comprise opening a vehicle door, starting an engine, releasing an immobilizer, releasing driver assistance system and/or further vehicle functions. The method comprises receiving a request to a server to issue a vehicle key for the use of vehicle functions of the vehicle for a mobile terminal, generating the vehicle key by means of the server, transmitting the vehicle key to a secure element of the mobile terminal, and storing the vehicle key in the secure element of the mobile terminal.

The server can execute one or more services. For example, the server can execute a backend service for communication with the NFC device, a trusted service manager for communication with the secure element of the NFC device and/or the NFC device and further services. For example, the trusted service manager can be arranged logically between the backend or a service of the backend and a device manufacturer or a service of the device manufacturer. The trusted service manager can be operated by a device manufacturer, a vehicle manufacturer and/or a trustworthy third party. The vehicle key, also referred to below for short as key, can be a master key or a slave key. The master key can be, for example, the key of the owner of the vehicle, a keeper of the vehicle and/or an authorized user, e.g. an authorized main user. By means of the master key, the owner of the vehicle can permit, for example, a slave key to be produced in order to share vehicle functions with users.

Transmitting and storing the vehicle key in the secure element of the mobile terminal makes it possible to improve the vehicle access for mobile terminals efficiently. A hardware key is no longer necessary for the vehicle access. The vehicle access can therefore be simplified.

According to one advantageous refinement, the secure element and the short range radio system of the mobile terminal can be connected for direct communication, in particular connected for direct communication in such a way that software which can be changed without a physical connection to the terminal cannot influence the communication. In this way, the security during the communication within the mobile terminal can be increased.

According to a further advantageous refinement, the vehicle key can represent cryptographically processed data. This can prevent the vehicle key for a specific vehicle from being able to be simulated by unauthorized third parties.

According to a further advantageous refinement, the method can also comprise sending the vehicle key by means of the mobile terminal to the vehicle using the direct communication inside the mobile terminal, verifying the vehicle key by means of the vehicle, and if the vehicle key was successfully verified by the vehicle: executing a vehicle function, in particular the vehicle function of activating a vehicle locking system. In this way, access to a vehicle can be made possible by means of a mobile terminal in a quick and simple manner.

According to a further advantageous refinement, the mobile terminal can be configured to provide secure cryptographical proof of its identity. The mobile terminal can also send the cryptographically secured identity to the vehicle. By using a secured cryptographical identity it is possible to identify the mobile device in a falsification proof fashion. The security of the vehicle access is therefore further increased.

According to a further advantageous refinement, the method can comprise receiving a request to delete the vehicle key of the mobile terminal at the server, and/or transmitting a command to delete the vehicle key to the vehicle, and/or transmitting a command to delete the vehicle key to the mobile terminal. This can improve the security of the vehicle access efficiently. The vehicle key can be controlled in a centralized fashion both at the mobile terminal and at the vehicle, e.g. can be deleted by means of a backend service or a trusted service manager. The vehicle access can therefore be protected efficiently.

According to a further aspect, the invention is distinguished by a server which is configured to receive a request to the server to issue a vehicle key for the use of vehicle functions of the vehicle for a mobile terminal, generate the vehicle key by means of the server, transmit the vehicle key to a secure element of the mobile terminal, and store the vehicle key in the secure element of the mobile terminal. The server can further be configured to execute the method described above.

According to a further aspect, the invention is distinguished by a vehicle which is configured to send an authentication request to a mobile terminal, receive a response to the sent authentication request, wherein the response to the sent authentication request was generated by means of a vehicle key stored on a secure element of the mobile terminal, verify the response to the sent authentication request, and if the vehicle successfully verifies the response, to execute a vehicle function.

Further features of the invention can be found in the claims, the figures and the description of the figures. All the features and combinations of features specified in the description and the features and combinations of features specified below in the description of the figures and/or only shown in the figures can be used not only in the respectively given combination but also in other combinations or else alone.

The invention is based on the considerations presented below:

In the text which follows, a system and/or a method for the issuing, management and use of driving authorizations on NFC devices are described, also taking into account automotive specific aspects. The description of the invention relates below, in particular, to the short range radio technology, near field communication, known for short as NFC, which is currently widely commercially available, but can also be transferred to other technologies such as e.g. Bluetooth low energy. A user is typically registered at the backend/server.

For example, the system can execute a method for configuring a mobile terminal, e.g. an NFC device, one or more servers which form the backend and on which one or more (backend) services are executed, and a vehicle to control vehicle functions, wherein the mobile terminal and the vehicle each have a short range radio system, e.g. NFC. The method can send to the server a request to issue an authentication, e.g. a key or a vehicle key, for the use of vehicle functions of the vehicle for a mobile terminal, and can generate the authentication by means of the server and send it to the mobile terminal. The authentication can optionally be received and stored at the vehicle. The authentication can optionally be received at the mobile terminal and stored in a secure element of the mobile terminal. The secure element and the short range radio system of the terminal can be connected for direct communication, in particular connected for direction communication in such a way that software which can be changed without a physical connection to the terminal cannot influence the communication. The authentication can represent cryptographically processed data.

The authentication can be sent by means of the mobile terminal to the vehicle using the direct communication within the mobile terminal, and the authentication can be checked by means of the vehicle. In the case of successful authentication, a vehicle function, in particular the activation of a vehicle locking system, can be executed. The mobile terminal can be configured to provide secure cryptographical proof of its identity. The cryptographically secured identity can be sent to the vehicle by means of the mobile terminal, wherein the authentication is, for example, a public cryptographic certificate, a chip card, e.g. a smartcard or an RFID card, a transition number and/or a key code.

A request that the authentication of the mobile terminal is no longer to be valid can be received at the server. Furthermore, a message can be sent to the vehicle that the authentication of the mobile terminal is no longer valid and a message can be sent to the mobile terminal that the authentication of the mobile terminal is no longer valid.

In the text which follows, a preferred exemplary embodiment of the invention will be described on the basis of the appended drawings. This reveals further details, preferred embodiments and developments of the invention. In particular, in the schematic drawings:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
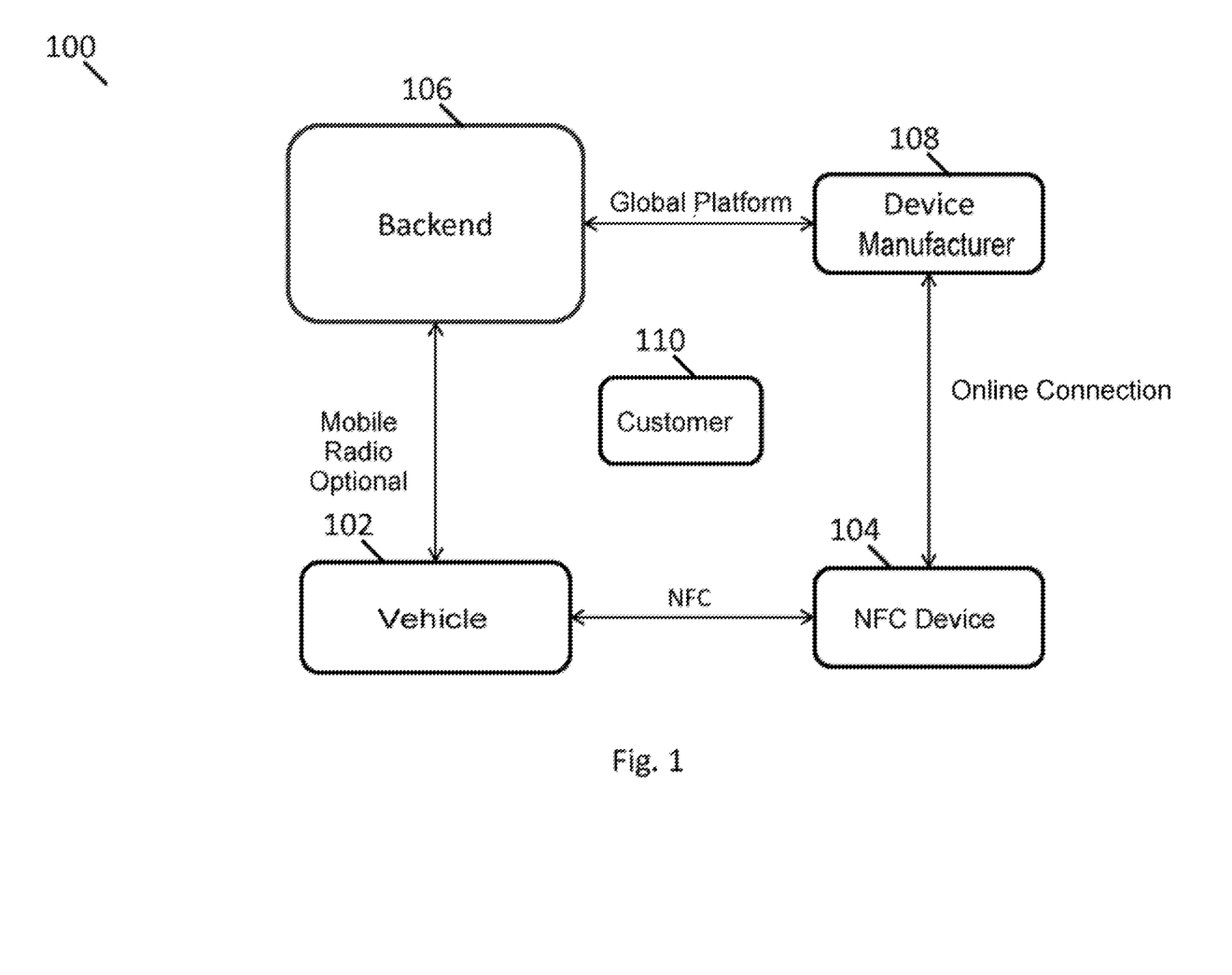
FIG. 1 shows an exemplary system for issuing, managing and using driving authorizations on NFC devices.

In detail, as shown in FIG. 1, the system 100 can comprise the following components:

a vehicle 102 equipped with an immobilizer and door locking system, NFC reading devices and a logic unit which are suitable for the invention. An online connection of the vehicle is optional. An human machine interface for managing authorizations on the vehicle is also optional.

an NFC device 104 or generally an object which a customer or user of the vehicle carriers on his person, equipped with short range radio technology, e.g. NFC, an internal secured memory and a logic system, in order to set up communication with an opposite station, e.g. an NFC reader or an NFC reading device. Specific embodiments may be: an NFC smartcard, a smartphone with NFC interface and a secure element (a smartphone is considered herein to be a combination of a device manufacturer and a NFC device), NFC sticker with suitable functionality, vehicle key, also referred to below as ID signal transmitter, with NFC functionalities. Further designs and combinations may also be possible.

a backend system 106 for managing users, vehicles, devices and/or authorizations. In particular, there are a user frontend, connections to supplier systems for driving authorizations (e.g. global platform services) and/or access to relevant databases.

a device manufacturer 108: the device manufacturer 108 can produce a smartphone which comprises the NFC device 104. Alternatively, the device manufacturer can produce or market a computer which sets up a connection to an NFC device, for example by USB cable.

Proof of Ownership

A customer 110, also referred to below as user, can have his BMW account activated by means of a proof of ownership of the vehicle 102 (e.g. can present a registration document to a dealer, carry out online checking on idnow. de, . . . ), in order to issue and manage driving authorizations himself for NFC devices via an Internet portal.

The customer 110 also has the possibility of deactivating the "NFC access function" in the vehicle when buying and/or selling a second-hand car, in order to avoid misuse. The proof of ownership then has to be submitted again in order to re activate the function.

Issuing a Driving Authorization

"Driving authorizations" in the sense of this invention are cryptographically secured data (e.g. certificates) which comprise inter alia information about the device used, specifically its uniquely defined identifier, also referred to for short as ID, the vehicle identification number, also referred to for short as VIN, details on the scope of the granted authorization and finally further data fields relating to the particular use (cf. in this respect also DE 10 2014 217 899).

If the customer 110 requests a new driving authorization for a vehicle 102 for a specific NFC device 104, the driving authorization is generated in the backend 106 and transmitted to the NFC device 104 in order to store it in its secure element, referred to for short as SE. The software with the authorization routines for the communication with the vehicle 102 is also stored in the SE.

In the case of NFC devices 104 whose SE can be addressed via the global platform, referred to for short as GP, standard, the driving authorization is transmitted from the BMW backend 106 to the NFC device 104 using the GP. In the case of NFC devices 104 whose SE cannot be addressed via GP, a proprietary process which is predefined by the manufacturer 108 of the NFC device 104 is used to transmit the driving authorization. In the case of NFC devices 104 with an online connection, the transmission of the driving authorization takes place via this online connection (mobile radio, WLAN, etc.). In the case of NFC devices 104 without an online connection, an NFC reading device is used, e.g. at a PC at the customer's home or via the NFC enabled cellphone of the customer.

In one advantageous refinement, the device already provides the possibility of providing proof of its identity, e.g. a device ID, in a cryptographically secure fashion with respect to an opposite station. A cryptographically secured data set which is public (not to be kept secret), e.g. a certificate, can confirm, in a way which is disconnected from the above, that the device ID is already known in the backend system and trustworthy. This notification can take place via the global platform standard. The abovementioned driving/access authorization can then in turn be implemented in this refinement as a certificate which is not kept secret, with the result that the driving authorization can also be transferred on potentially insecure channels without the risk of disadvantages for the security of the overall system.

News

Such an NFC device can be used without delay directly at the vehicle to unlock and produce the driving authorization. In this context, the NFC component communicates within the device via a direct connection to the SE and is therefore protected against software manipulations, e.g. by a manipulated app. The system is configured in such a way that at the moment of use of the device at the vehicle during everyday operation there is no need for a backend connection. This permits e.g. access to the vehicle and starting of the engine even in underground garages without mobile radio reception.

Management

The customer has the possibility of viewing the active driving authorizations for his vehicles and deleting individual authorizations in the Internet portal. If an authorization is deleted, it is de activated both in the vehicle and in the NFC device if these can be reached via an online connection. The backend, referred to for short as BE, logs on an ongoing basis which driving authorizations were active at what time, which is a requirement for insurers. The customer also has the possibility of viewing in the vehicle the active NFC devices via a human machine interface, referred to for short as HMI, and activating said devices there, which is also signaled back to the BE.

Advantages of the Invention

The implementation as a backend supported overall system provides multiple advantages:

An overview as to which authorizations are issued for which devices and vehicles is available in the BE at all times. The revocation status of the authorizations can also be followed virtually at all times.

A user interface (e.g., web based) at the BE permits customer friendly and intuitive management of devices and authorizations.

Backend support together with a GP enabled device provides the possibility of transferring the driving authorizations onto the device online.

The system shown permits very flexible assignment of multiple vehicles to multiple devices by means of authorizations in the sense of an (m:n) relationship. (Multi key/multi car property).

Authorizations can be deleted both in the vehicle and online.

After successful activation of an authorization, there does not have to be an online connection of the vehicle and/or device for everyday use cases.

Many devices, also including NFC enabled cellphones, require no separate power supply, or only marginal residual battery charge states, for everyday use cases (opening/starting).

Software is understood here to be processing commands to electronic computing units. Data is not software, and vice versa. The secure element can also store procedural instructions as to the way in which the authentication is exchanged with the vehicle and/or the server. The authentication is typically cryptographically secured data, in particular certificates.

Figure 2:
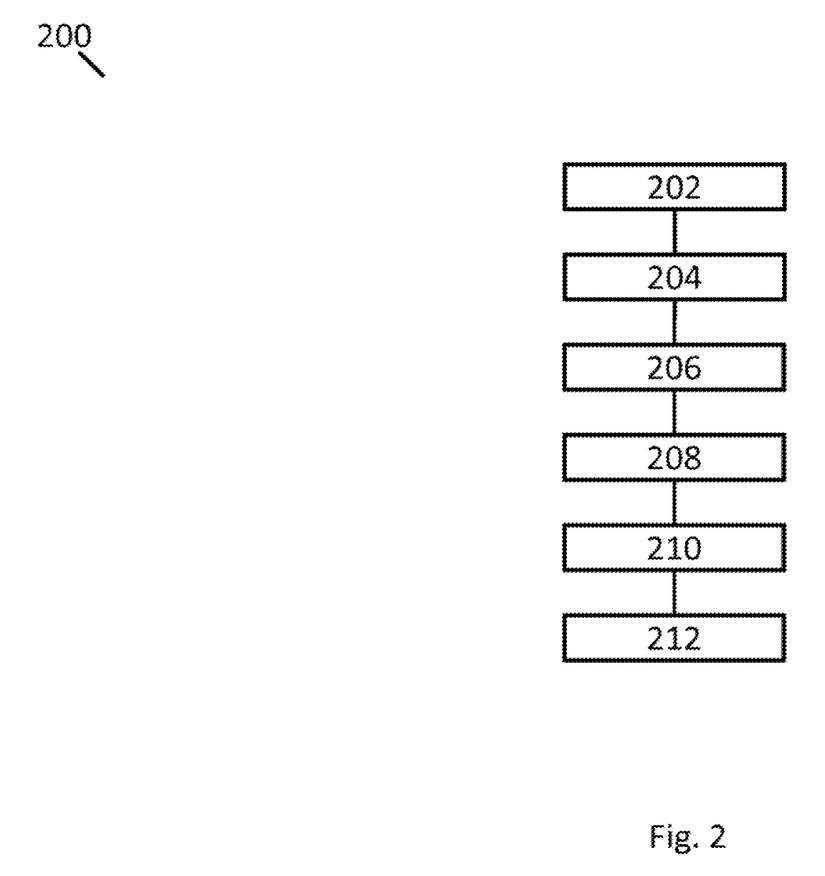
FIG. 2 shows an exemplary method for configuring a master key on an NFC device.

FIG. 2 shows in detail an exemplary method 200 for configuring a master key, on an NFC device 104. The master key can be a key which is assigned to the owner of the vehicle. The master key can comprise a driving authorization which permits all the driving authorizations of the vehicle to be controlled. For example, the driving authorizations can comprise opening the doors of the vehicle and/or starting the vehicle. In order to be able to communicate, configure or install the master key on the NFC device, e.g. a smartphone or a mobile device with the possibility via NFC, an owner of a vehicle can register himself at a backend, in particular with a backend service, e.g. a backend service of the manufacturer of his vehicle. After a successful registration of the vehicle, the owner of the vehicle can receive access data to the backend service. The access data can be input by the owner of the vehicle, e.g. the customer 110, into an app on the NFC device, e.g. an app of an NFC enabled smartphone, and transmit it to the backend service in order to sign on 202 to the backend service. The signing on to the backend service can be carried out via an encrypted connection of a wireless and/or wire bound communication channel of the NFC device. The backend service can receive and check the access data of the owner of the vehicle.

If the checking of the access data is successful, the backend service 108 can transmit, to the NFC device 104, a message for confirming successful signing on of the owner of the vehicle with his access data. The message can comprise a chassis number, also to referred to as vehicle identification number VIN, of a vehicle 102 of the owner of the vehicle. Using the app of the NFC device 104, the owner of the vehicle or the customer 110 can start 204 addition or installation of a key, in particular a master key, on the NFC device 104 of the owner of the vehicle. The addition of the key can be carried out for a specific vehicle 104 which can be determined unambiguously by the chassis number of the vehicle 104. The addition of the key can comprise an identification of the owner 110 of the vehicle. For example, the app can pose a question the owner 110 of the vehicle whose response only the owner of the vehicle knows. In other words, the starting of the addition of the key to the NFC device can be secured additionally with a challenge response procedure.

The app of the NFC device 104 can read out an identifier of a secure element of the NFC device. To do this, the app can transmit a request message to the secure element and receive the identifier of the secure element as a response message. The identifier of the secure element and/or the chassis number of the vehicle 102 can be transmitted by the app to the backend service 108, in order to execute 206 the addition of the key to the NFC device 108 in the backend. The backend service can receive the message of the app. After reception of the message, the backend service 106 can determine 208 the key, in particular the master key, in order to unlock the vehicle 102 or enable the vehicle, from a key database. Furthermore, the backend service 106 can transmit, to a service of the manufacturer of the NFC device 108, a message for the installation of a security domain on the secure element of the mobile device. The service of the NFC device manufacturer can install 210 the security domain on the secure element of the NFC device 104 and transmit the key for the security domain to the backend service 106. The backend service 106 can also adapt a key application.

For the installation of the key application, the backend service 106 can set up a secure channel to the secure element of the NFC device. For the setting up of the secure communication channel, the backend service 106 can use the key of the security domain. The key application can be transmitted to the secure element of the NFC device 104 via the secure communication channel, and stored in the secure element of the NFC device 104. Furthermore, the key for unlocking the vehicle can be transmitted from the backend service 106 to the secure element of the NFC device 104 via the secure communication channel, and can be stored 212 in the secure element of the NFC device 104. After the transmission and storage of the key at the secure element of the NFC device 104, the backend service 106 can transmit a message to the app of the NFC device, which app indicates successful installation of the key on the NFC device 104. Using the backend service 106 permits a secure transmission of the key to the secure element of the NFC device 104 to be made available. The owner 110 of the vehicle can use the NFC device 104, for example, for access to his vehicle. In addition, the owner 110 of the vehicle can use the NFC device 104 to create slave keys on the basis of the transmitted and stored master key. By means of the slave key, the owner of the vehicle can efficiently and selectively create, distribute and/or cancel driving authorizations for the vehicle 102.

Figure 3:
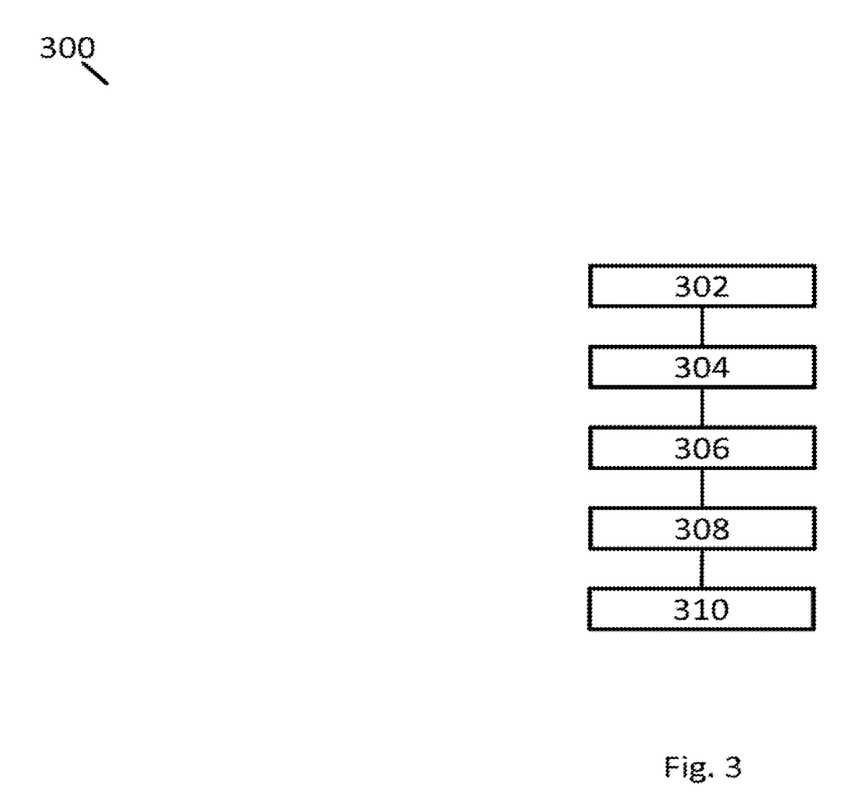
FIG. 3 shows an exemplary method for activating a master key in a vehicle.

FIG. 3 shows activation 300 of a key, in particular of a master key, stored in an NFC device 104 in a vehicle 102. The customer 110 can start 302 the activation 300 of the key, in particular of the master key, in a vehicle 102. The activation of the key by the customer 110 can be started, for example, via an input interface of the vehicle 102 in a head unit, or via a control unit of the vehicle. The head unit or the control unit of the vehicle 102 can output, for example, an operator control request to the customer 110, which requests the customer to position the NFC device 104 on an NFC reading device or in the vicinity of an NFC reading device of the vehicle 102, so that the NFC reading device can recognize 304 and/or read the NFC device 104.

If the NFC reading device has recognized the NFC device 104, the NFC reading device of the vehicle 102 can transmit a message to the control unit to control the vehicle access and/or the driving authorizations, also referred to below as body domain controller, or for short BDC. The BDC can set up a preferably secure communication connection via the NFC reading device of the vehicle 102 to the secure element of the NFC device 104 and read out 306 data for activating the key stored in the secure element, from the secure element of the NEC device. For this purpose, the BDC can interrogate an identifier of the key application stored in the secure element and transmit a command to the key application in order to receive data for activating the key. This data, i.e. the data for activating the key, can be verified by the BDC. Known cryptographic methods can be used for the verification and authentication of the data. In addition, an ID signal transmitter, e.g. a vehicle key, may be necessary for activating the key, in particular the master key, which ID signal transmitter is authenticated 308 by the BDC. The authentication of the ID signal transmitter by the BDC can efficiently increase the security when activating the key, in particular the master key.

For the verification and/or authentication of the data by the ID signal transmitter it is possible for the data to be transmitted to the ID signal transmitter and verified and/or authenticated on the ID signal transmitter. If the verification and/or authentication of the data for activating the key is successful, the BDC can activate 310 the key, in particular the master key. The customer 110 of the vehicle 102 can be informed about successful activation of the key. For example, a message about the successful activation of the key can be displayed on a display unit of the head unit and/or of the NFC device 104. As a result of the successful activation of the key, in particular of the master key, the driving authorizations which are linked to the master key can be used in the vehicle 102. As a result of the use of the ID signal transmitter to activate the master key, the security can be increased efficiently. For the activation, the customer has to present both a master key in the secure element of the NFC device 104 and an ID signal transmitter, e.g. a vehicle key, in order to be able to activate the master key.

Figure 4:
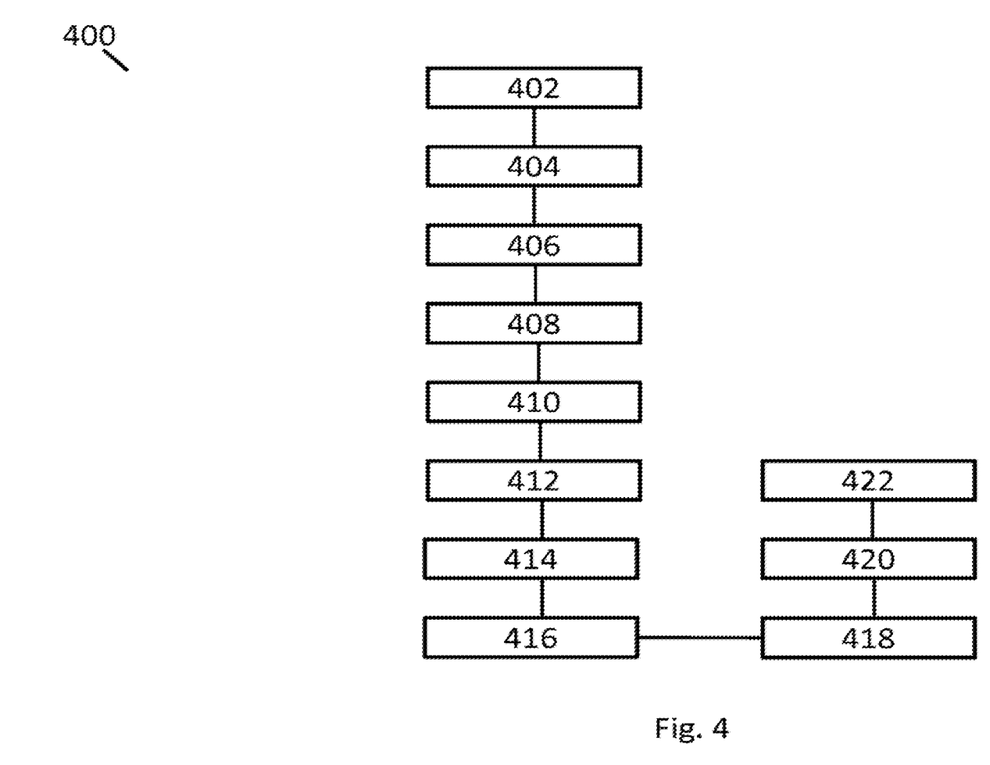
FIG. 4 shows an exemplary method for configuring a slave key on an NFC device.

FIG. 4 shows an exemplary method 400 for configuring a slave key on an NFC device 104. A slave key is a key which is derived from a master key and can be distributed, for example by the customer 110 or owner of the vehicle 102, to a user of the vehicle 102. The customer 110 of the vehicle 102 can therefore distribute driving authorizations for the vehicle 102 by means of slave keys in a dynamic and flexible fashion. In order to configure a slave key on an NFC device, a customer 110 can use an NFC device on which the master key is stored to define which NFC device a slave key is to be transmitted to.

The customer 110 can initially authenticate himself 402 with an app of the NFC device 104 with respect to the backend or the backend service. For example, the app of the NFC device can make an input request for the inputting of signing on data or authentication data, e.g. a user name and/or a password or other identification data, of the customer 110. The signing on data can be transmitted from the app of the NFC device 104 to the backend service 106. The backend service 106 can receive and check the signing on data. Given successful checking, the backend service 106 can transmit a confirmation message to the app of the NFC device. The confirmation message can comprise one or more chassis numbers of vehicles 102 of the customer 110 which are linked to the authentication data of the customer 110 in the backend service. If the authenticated customer is the owner of the vehicle, the app of the NFC device can offer a function with which the customer can share and/or pass on the key of the vehicle for a specific chassis number. The key which is shared and/or passed on can be referred to as a slave key. The NFC device on which the master key is stored is also referred to below as master NFC device. The NFC device on which the slave key is stored is also referred to below as slave NFC device.

If the customer 110 would like to share the vehicle 102, he can select the vehicle 102 or the received chassis number of the vehicle 102 by means of the app of the master NFC device. Furthermore, the customer can input data with which the slave NFC device can be unambiguously identified. An unambiguous identification of the slave NFC device can be carried out, for example, by means of a telephone number, a device number and/or another uniquely defined identifier of the slave NFC device. In addition, the app can read out an identifier of the secure element of the master NFC device. In order to trigger configuring of the slave key on a slave NFC device, the app of the master NFC device can transmit a message for the installation of a slave key to the backend. The message can be generated, for example, after a user interaction by the customer with the app of the master NFC device and be transmitted from the backend service. The message preferably comprises the chassis number of the vehicle for which the slave key is to be configured, the identifier of the secure element in which the master key is stored, and/or an identifier with which the slave NFC device can be unambiguously identified.

The backend service can receive 404 the message for the installation of a slave key from the master NFC device. After reception of the message, the backend service can transmit 406 an activation transaction number, referred to for short as activation TAN, to the secure element of the master NFC device. The transmitted activation TAN can be displayed to the customer on the master NFC device via a secure display. In addition, the backend service can identify 408 the slave NFC device by means of the transmitted identifier of the slave NFC device. For example, the backend service can transmit 410 a push message to the slave NFC device. The push message can comprise, for example, the chassis number of the vehicle. By means of the push message, the slave NFC device can be informed that a slave key is to be installed on the slave NFC device. The push message can be displayed, for example, in an app of the slave NFC device to a user of the slave NFC device. The user can confirm configuration of the slave key on the slave NFC device. After the confirmation of the configuration of the slave key, the app of the slave NFC device can read out the identifier of the secure element of the slave NFC device and transmit it to the backend service. In addition to the identifier of the secure element of the slave NFC device, the message can also comprise the chassis the number of the vehicle for which the slave key is to be configured.

The backend service can receive 412 the message of the app of the slave NFC device, read out the slave key for the chassis number from a key database and/or transmit 414 a command for the installation of a security domain for the secure element of the slave NFC device to a service, in particular to a trusted service manager, of the slave NFC device manufacturer. The trusted service manager can install a security domain on the secure element of the sleeve NFC device and transmit 416 a cryptographic key of the security domain to the backend service.

By means of the cryptographic key, the backend service can set up a secure connection to the secure element of the slave NFC device and transmit 418 a key application to the secure element and install it on the secure element. Before the transmission to the secure element, the key application can be adapted by the backend service to the slave key, the chassis number, the activation TAN and/or the secure element. As already described in FIG. 2, the key application comprises the instructions which are necessary so that a user can authenticate himself with respect to the vehicle by means of the NFC device and receives the corresponding driving authorizations.

After the installation of the key application on the secure element of the slave NFC device, the user of the slave NFC device can be requested to input the activation TAN, which is transmitted to the master NFC device. The transmission of the activation TAN can take place, for example, by telephone, verbally or by means of another method for exchanging the activation TAN. In addition to a manual exchange of the activation TAN, the activation TAN can also be effected in an automated fashion via a data interface between the master NFC device and the slave NFC device. If the exchange of the activation TAN has taken place and has been verified 420 by the backend service, the backend service can transmit the slave key to the secure element of the slave NFC device. The user of the slave NFC device and the customer of the master NFC device can be informed 422 about the successful transmission of the slave key by the backend transmitting a corresponding message to the respective devices.

After the successful transmission of the slave key to the secure element of the slave NFC device the user can use the slave NFC device to authenticate himself with respect to the vehicle. The vehicle in turn can grant the corresponding driving authorizations for the vehicle to the user. If the user is authenticating himself for the first time with the slave key with respect to the vehicle, it can be necessary that the vehicle has to activate the slave key before it is possible to use the vehicle. The activation of the slave key can take place in a way analogous to the activation method described above in FIG. 3, with the difference that no ID signal generator, e.g. a vehicle key, may be necessary to activate a slave key.

Figure 5:
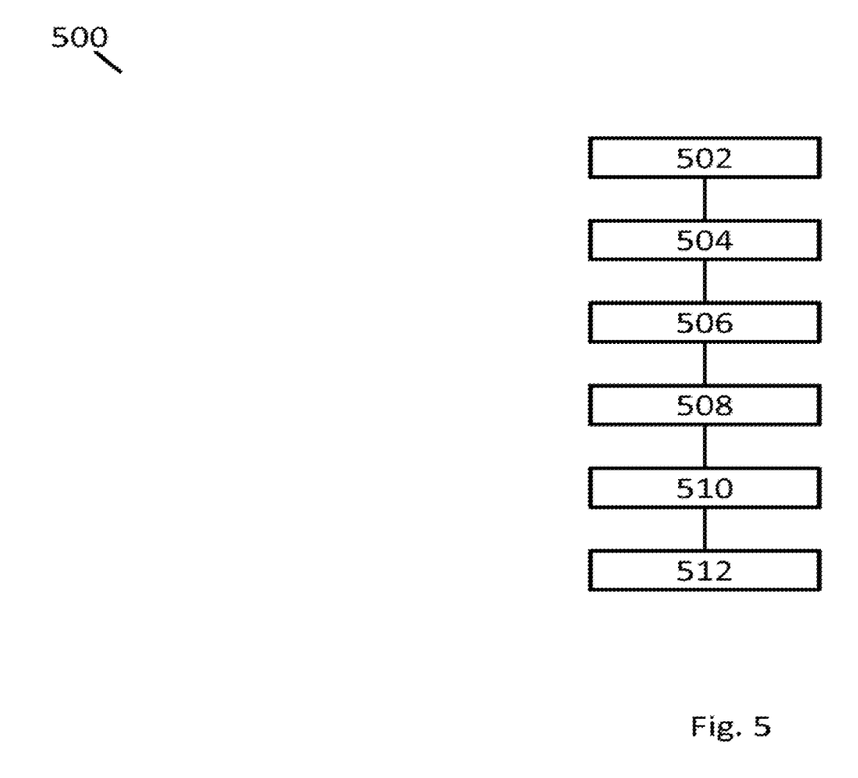
FIG. 5 shows an exemplary method for using vehicle functions by means of a master key or a slave key.

FIG. 5 shows an exemplary method 500 for the use of vehicle functions by means of a master key or slave key stored on an NFC device. A vehicle function can comprise, for example, opening or closing a vehicle door or a vehicle flap, starting an engine of the vehicle and/or access to digital (online) services and/or driver assistance systems of the vehicle. The customer or user can move the NFC device into a reading area of an NFC reading device. A vehicle can comprise one or more NFC reading devices. Each of the NFC reading devices of the vehicle can preferably look for an NFC device in the respective reading or transmitting/receiving range and detect 502 an NFC device. An NFC reading device can be mounted, for example, on an outer side of the vehicle or be integrated into an outer side of the vehicle. The NFC reading device which is located on the outer side of the vehicle can be used to detect NFC devices in the external region of the vehicle, in order, for example, to permit opening or closing of a vehicle door and/or of another vehicle access. A further NFC reading device can be integrated, for example, into the internal region of the vehicle. The NFC reading device which is integrated in the internal region of the vehicle can be used, for example, to permit starting of the engine of the vehicle.

After an NFC reading device of the vehicle has detected an NFC device, the NFC reading device of the vehicle can transmit 504 a message for the selection of a key application to the secure element of the NFC device. Depending on the key application selected, a certain vehicle function of the vehicle can be enabled or disabled. The selection of the key application can be made from the NFC device or can be predefined by means of the NFC reading device. If the key application is present or stored on the secure element of the NFC device, the NFC device can confirm the message of the NFC reading device of the vehicle. The NFC reading device of the vehicle can send 506 a message to the control unit to lock or unlock the vehicle, also referred to as body domain controller, BDC for short, with which message the BDC can be woken up. In addition, the NFC reading device can carry out 508 a challenge response authentication with the secure element of the NFC device. For this purpose the NFC reading device can transmit a challenge message the NFC device and receive a response message from the NFC device. The response message can be generated by the key application of the NFC device using the key, e.g. the master key or the slave key. Both the challenge and the response can be transmitted by the NFC reading device to the BDC for verification. The BDC can verify 510 the response of the NFC device to the challenge which has been sent. If the response has been verified as correct by the BDC, the BDC can enable 512 the vehicle function, e.g. can release the door of the vehicle or start the engine of the vehicle.

If the key, e.g. the master key or the slave key, is not known on the BDC, the BDC can transmit a command to the secure element of the NFC device and request an activation data packet. By means of the activation data packet, the BDC can verify the response of the NFC device. If the response was successfully verified by the BDC, the BDC can, as described above, enable the corresponding vehicle function.

Figure 6:
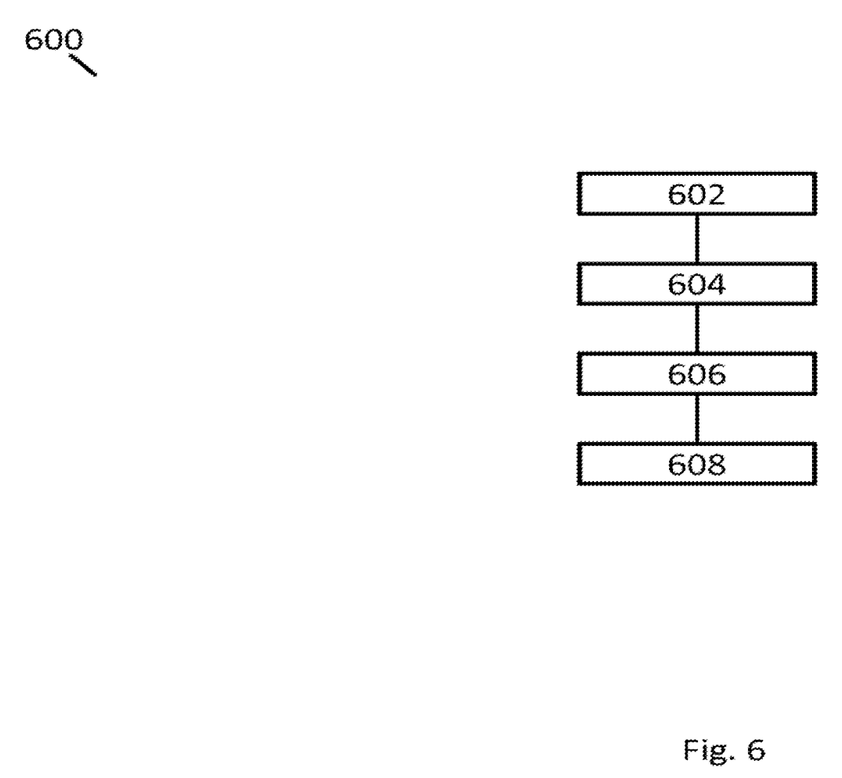
FIG. 6 shows an exemplary method for canceling a key on an NFC device.

FIG. 6 shows an exemplary method 600 for canceling or deleting a key, e.g. a master key or a slave key, on an NFC device. The key can be deleted on by a service, e.g. by the trusted service manager, on the secure element of an NFC device. The trusted service manager can receive 702 a command to delete the key from the backend service. The command to delete the key can comprise a chassis number of the vehicle for which the key is valid and/or a uniquely defined identifier of the NFC device. By means of the chassis number and/or the uniquely defined identifier of the NFC device, the trusted service manager can determine 704 an identifier of the secure element. For example, the trusted service manager can execute a database interrogation in order to determine the identity of the secure element of the NFC device. The command to delete the key can be transmitted 606 to the secure element of the NFC device by the trusted service manager. The secure element of the NFC device can receive the command, and the key application can delete the key from the secure element of the NFC device. The deletion of the key can be confirmed 608 by the key application of the secure element by the transmission of a confirmation message to the trusted service manager.

The method for deleting the key on the secure element of an NFC device can be started by an app of the NFC device, by the head unit of the vehicle and/or by the backend service or an administrator of the backend service. Therefore, the key and thus the driving authorizations of the vehicle can be cancelled in a flexible way.

LIST OF REFERENCE NUMBERS

100 System
102 Vehicle
104 NFC device
106 Backend or backend services
108 Device manufacturer or services of the device manufacturer
110 Customer
200 Method for configuring a master key
202 Signing on to a backend service
204 Starting addition of a master key to an NFC device
206 Executing the addition of the master key to the NFC device in the backend service
208 Determining the master key in order to enable the vehicle in a key database
210 Installing a security domain on the secure element of the NFC device
212 Transmitting and storing the master key on the secure element of the NFC device
300 Activating a master key in a vehicle
302 Starting the activation process for activating the master key
304 Detecting the NFC device
306 Reading out data for activating the master key from the secure element of the NFC device
308 Authenticating the ID signal transmitter by means of the BDC
310 Activating the master key
400 Method for configuring a slave key on an NFC device
402 Authenticating the customer with respect to the backend
404 Receiving a message for the installation of a slave key
406 Transmitting the activation TAN to the secure element of the master NFC device
408 Identifying the slave NFC device
410 Transmitting a message to the slave NFC device
412 Receiving the identifier of the secure element of the slave NFC device
414 Transmitting a command to install a security domain
416 Transmitting the security domain and the associated cryptographic key
418 Transmitting the key application
420 Verifying the activation TAN
422 Informing about the successful transmission of the slave key
500 Method for using vehicle functions
502 Detecting an NFC device
504 Transmitting a message to the NFC device
506 Sending a message to the BDC
508 Carrying out a challenge response authentication
510 Verifying the response message
512 Enabling the vehicle function
600 Method for deleting a key
602 Receiving a command to delete the key
604 Determining an identifier of the secure element of an NFC device
606 Transmitting the command to delete the key to the secure element of the NFC device
608 Confirming successful deletion of the key The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for configuring a mobile terminal to control vehicle functions of a vehicle, wherein the mobile terminal and the vehicle each comprise a short range radio system, wherein the method comprises:
   receiving, by a server, a request to issue a vehicle key for the use of vehicle functions of the vehicle for a mobile terminal;
   generating, by the server, the vehicle key in response to the request;
   transmitting, by the server to a service of a manufacturer of the mobile device, a message to install a security domain on a secure element of the mobile device;
   transmitting the vehicle key to the secure element of the mobile terminal; and
   storing the vehicle key in the secure element of the mobile terminal.

2. The method as claimed in claim 1, wherein the vehicle key represents cryptographically processed data.

3. The method as claimed in claim 1, wherein the mobile terminal is configured to provide secure cryptographic proof of its identity, and wherein the method further comprises sending, by the mobile terminal, the cryptographically secured identity to the vehicle.

4. The method as claimed in claim 1, further comprising at least one of:
   receiving, by the server, a request to delete the vehicle key of the mobile terminal at the server;
   transmitting, to the vehicle, a command to delete the vehicle key; and
   transmitting, to the mobile terminal, a command to delete the vehicle key.

5. The method of claim 1, further comprising receiving, by the server, a key for the security domain from the service of the manufacturer of the mobile device.

6. The method of claim 1, wherein transmitting the vehicle key to the secure element comprises:
   establishing a secure communication channel using the key for the security domain; and
   transmitting the vehicle key to the secure element via the secure communication channel.

7. The method as claimed in claim 1, wherein the secure element and the short range radio system of the mobile terminal are connected for direct communication such that software manipulation of the short range radio system that does not require a physical connection to the terminal cannot influence the communication.

8. The method as claimed in claim 7, wherein the mobile terminal is configured to provide secure cryptographic proof of its identity, and wherein the method further comprises sending, by the mobile terminal, the cryptographically secured identity to the vehicle.

9. The method as claimed in claim 7, further comprising:
   sending, by the mobile terminal, the vehicle key to the vehicle using the direct communication inside the mobile terminal;
   verifying, by the vehicle, the vehicle key; and
   if the vehicle key is successfully verified by the vehicle, the method further comprises executing a vehicle function of activating a vehicle locking system.

10. The method as claimed in claim 9, wherein the mobile terminal is configured to provide secure cryptographic proof of its identity, and wherein the method further comprises sending, by the mobile terminal, the cryptographically secured identity to the vehicle.

11. A server configured to:
   receive a request to issue a vehicle key for the use of vehicle functions of the vehicle for a mobile terminal;
   generate the vehicle key; and
   transmit, to a service of a manufacturer of the mobile device, a message to install a security domain on a secure element of the mobile device;
   transmit the vehicle key to the secure element of the mobile terminal, wherein the vehicle key is configured to be stored in the secure element of the mobile terminal.

12. The server as claimed in claim 11, wherein the vehicle key represents cryptographically processed data.

13. The server as claimed in claim 11, wherein the server is further configured to at least one of:
   receive a request to delete the vehicle key of the mobile terminal at the server;
   transmit, to the vehicle, a command to delete the vehicle key; and
   transmit, to the mobile terminal, a command to delete the vehicle key.

14. The server of claim 11, wherein the server is further configured to receive a key for the security domain from the service of the manufacturer of the mobile device.

15. The server of claim 11, wherein the server is further configured transmit the vehicle key to the secure element by:
   establishing a secure communication channel using the key for the security domain; and
   transmitting the vehicle key to the secure element via the secure communication channel.

* * * * *